(12) United States Patent
Pestoni

(10) Patent No.: US 11,521,432 B2
(45) Date of Patent: Dec. 6, 2022

(54) SYSTEM AND METHOD FOR ADAPTIVE DIAGNOSTICS AND DATA COLLECTION IN A CONNECTED ROBOT-CLOUD ENVIRONMENT

(71) Applicant: Florian Pestoni, Arlington, TX (US)

(72) Inventor: Florian Pestoni, Arlington, TX (US)

( * ) Notice: Subject to any disclaimer, the term of this patent is extended or adjusted under 35 U.S.C. 154(b) by 370 days.

(21) Appl. No.: 16/746,747

(22) Filed: Jan. 17, 2020

(65) Prior Publication Data

US 2020/0234514 A1    Jul. 23, 2020

Related U.S. Application Data

(60) Provisional application No. 62/793,406, filed on Jan. 17, 2019.

(51) Int. Cl.
| | |
|---|---|
| *G06Q 10/06* | (2012.01) |
| *B25J 9/16* | (2006.01) |
| *G07C 5/00* | (2006.01) |
| *G07C 5/08* | (2006.01) |
| *G06Q 10/04* | (2012.01) |

(52) U.S. Cl.
CPC ............ *G07C 5/008* (2013.01); *B25J 9/1674* (2013.01); *G06Q 10/0631* (2013.01); *G07C 5/085* (2013.01); *G05B 2219/50391* (2013.01); *G06Q 10/04* (2013.01)

(58) Field of Classification Search
CPC ........ G07C 5/008; G07C 5/085; B25J 9/1674; G05B 2219/50391
See application file for complete search history.

(56) References Cited

U.S. PATENT DOCUMENTS

| | | | | |
|---|---|---|---|---|
| 2018/0147721 | A1* | 5/2018 | Griffin | G05D 1/0274 |
| 2019/0369641 | A1* | 12/2019 | Gillett | G05D 1/0027 |
| 2020/0078937 | A1* | 3/2020 | Sun | G05B 19/0428 |

* cited by examiner

*Primary Examiner* — Manuel A Rivera Vargas
(74) *Attorney, Agent, or Firm* — Leavitt Eldredge Law Firm

(57) ABSTRACT

A system and method for adaptive diagnostics and data collection in a connected robot-cloud environment allows for the management and use of date from a robot or fleet of robots to ensure the efficient utilization thereof. The data is collected from the robots via a software agent and is transmitted to an interface that allows action from an end-user.

2 Claims, 4 Drawing Sheets

SYSTEM AND METHOD FOR ADAPTIVE DIAGNOSTICS AND DATA COLLECTION IN A CONNECTED ROBOT-CLOUD ENVIRONMENT

BACKGROUND

1. Field of the Invention

The present invention relates generally to robotic and autonomous machines, and more specifically to a system and method for adaptive diagnostics and data collection in a connected robot-cloud environment.

2. Description of Related Art

There is an increase in the art of autonomous machines, these machines include mobile robots, manipulator arms, self-driving cars and drones, and a variety of other machines or devices that perform physical tasks. They are configured and are deployed to perform service operations alongside humans. Conventionally, these autonomous machines are referred to as robots. Robots are used for a growing variety of activities, from managing grow modules in hydroponic farms to controlling the availability of items in retail stores, packaging orders for delivery at warehouses or delivering goods from stores to consumers.

There are a variety of different definitions for robots, but conventionally robots consist of a computer/central processing unit, sensors, communication modules, etc. A collection of robots operating in the field, often in far-flung locations, is known as a robot fleet.

Robots and robot fleets can be managed and/or controlled remotely, including over the internet. This requires local data collection on the robot and bi-directional communication between robot and cloud. However, traditional approaches for connecting devices to the Internet such as those used in data centers or for Internet of Things (IoT) devices are not effective for modern robots because (a) the amount of data managed on the robot is too large, (b) connection to the Internet is highly variable and often of limited bandwidth, especially for mobile robots and (c), computational resources on the robot side are also limited and should be available for local autonomy operations when necessary.

Accordingly, although great strides have been made in the area of autonomous machines, namely robots, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
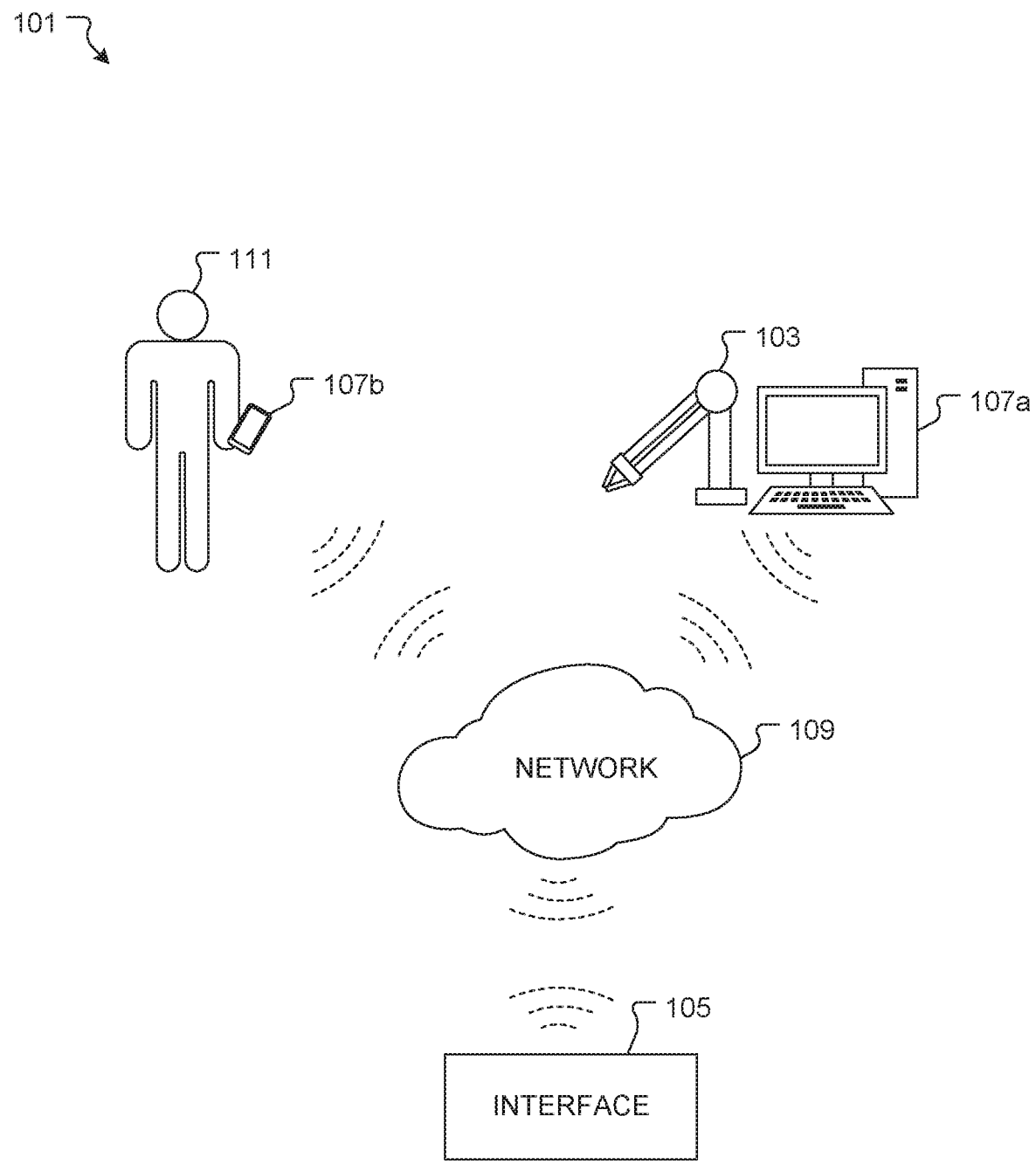
FIG. 1 is a diagram of a system for adaptive diagnostics and data collection in a connected robot-cloud environment in accordance with a preferred embodiment of the present application

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional autonomous machine systems. Specifically, the invention of the present application provides for a means to manage the resources of robot-side components of a robot cloud management environment such that robot resources are optimized depending on the specific circumstances. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a diagram of a system for adaptive diagnostics and data collection in a connected robot-cloud environment in accordance with a preferred embodiment of the present application. It will be appreciated that system 101 overcomes one or more of the above-listed problems commonly associated with conventional automated machine systems.

In the contemplated embodiment, system 101 includes a robot 103 in electronic communication with an interface 105 via a computing device 107 and network 109. An end-user 111 is also in electronic communication with the interface 105 via a computing device 107 and network 109.

Figure 2:
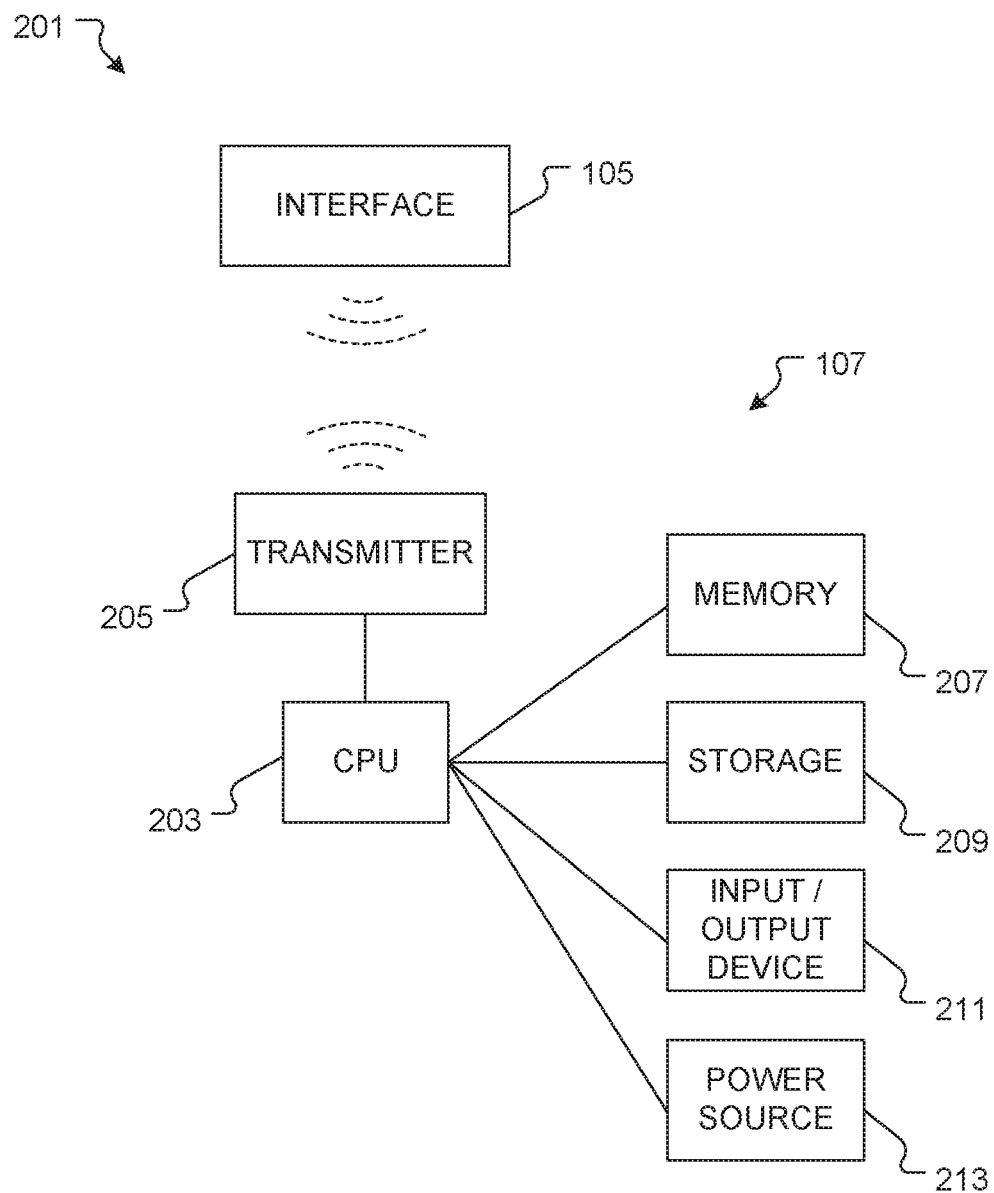
FIG. 2 is a simplified schematic of the operating environment of the system of FIG. 1.

As depicted by FIG. 2 the interface 105 and computing device create an electronic environment 201 wherein the system 101 functions. The computing device 107 includes a CPU 203 with a transmitter 205, memory 207, storage 209, input/output devices 211 and a power source 213. While these components are described they are done so as an example and not as a definitive list of all components that could be used to create the electronic environment 201.

Figure 3:
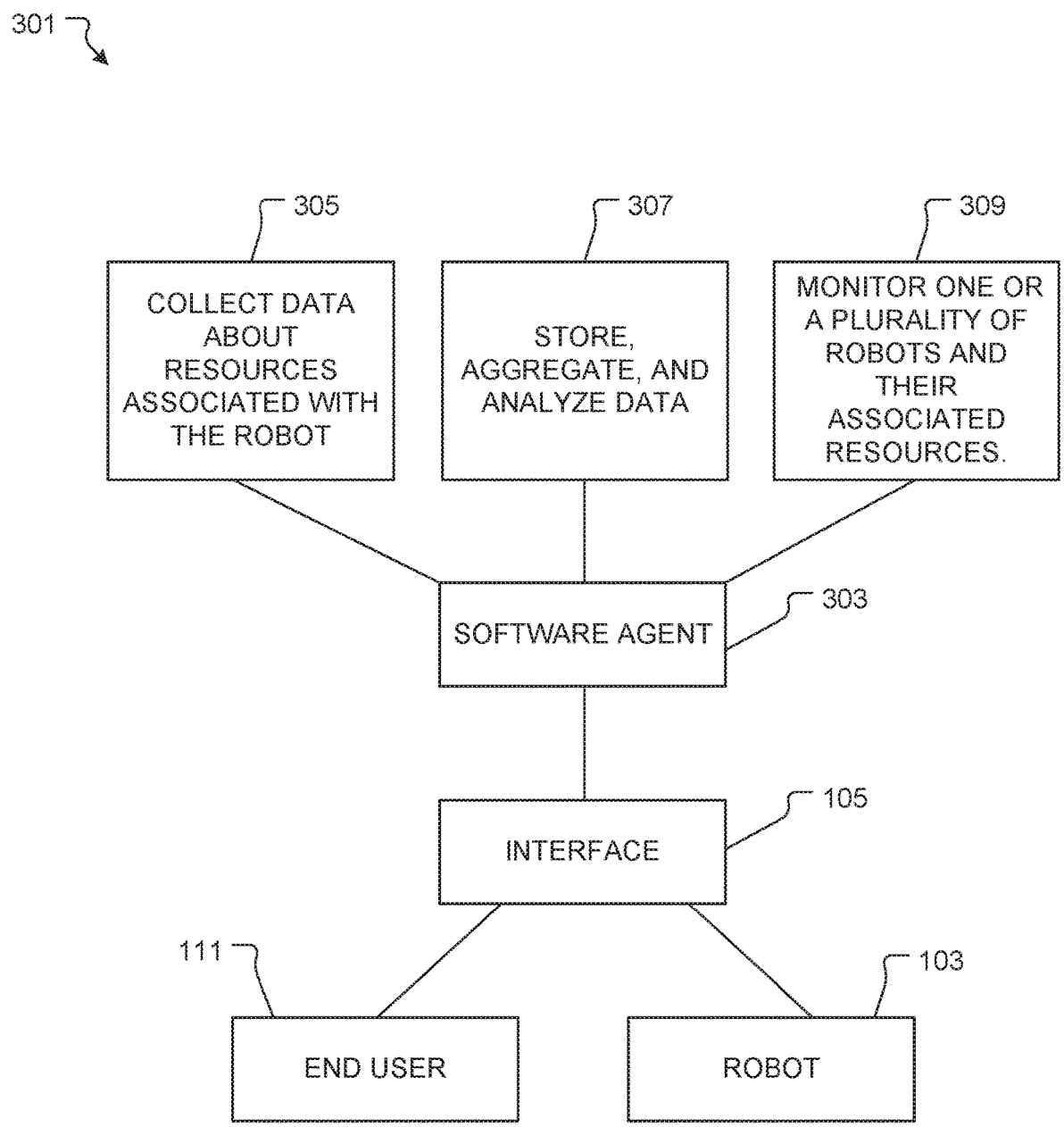
FIG. 3 is a diagram of the system of FIG. 1 in use.

Referring now to FIG. 3, the present invention is for a system and method that provide for adaptive diagnostics and data collection in a connected robot cloud environment. The system provides for a means to manage the resources of robot-side components of a robot cloud management system such that robot resources are optimized depending on the specific circumstances. The interface collects data about the resources associated with the robot 305 and transfers this data to the interface 105 via a software agent 303 that is configured to operate in the computing device 107 attached to the robot 103.

The interface 105 further stores, aggregates, analyzes 307 and further manipulates the data therein. The data and its derivatives are available to allow the end-user 111 to monitor one of the robots and their associated resources 309 via the interface 105. It is contemplated that the software agent 303 and the interface exist in any electronic environment 201 such as a server, the cloud, a browser or the like.

The end-user 111, which may include operators, executives, engineers, customers or other people who have remote interactions with the robots are able to select the data they need or desire from those available via the interface 105.

In the preferred embodiment, the software agent 303 collects information locally and performs a first level of monitoring and aggregation of data specific to a single robot 103. A portion of these data is transmitted securely and reliably from the software agent 303 to the interface running in the cloud. On the interface, data from one or more robots is further aggregated, stored and analyzed. The results may be accessible by the client application or by other applications via an API (application programming interface.)

It should be appreciated that the connection between the end-user 111 and the robot 103 is bi-directional, which enables commands to be initiated by end-users via interactions with the interface 105 or a cloud service. Additionally, the system 101 provides for management of the data flow from the robot 103 and thus allows for efficient use of any bandwidth the network 109 has available.

As should be understood, many resources of the robot are utilized during the process of collecting and transmitting data, as well as conveying and executing commands. The processes, which involves parsing, recording, compressing, and storing in real-time data uses CPU, memory and storage. Further, as is known in the art, transmitting data through the network uses bandwidth and may introduce latency. Accordingly, it is an object of the present invention to provide efficient resource utilization for resource data collection and transmission, to optimize the conditions in which data is used within the system.

Figure 4:
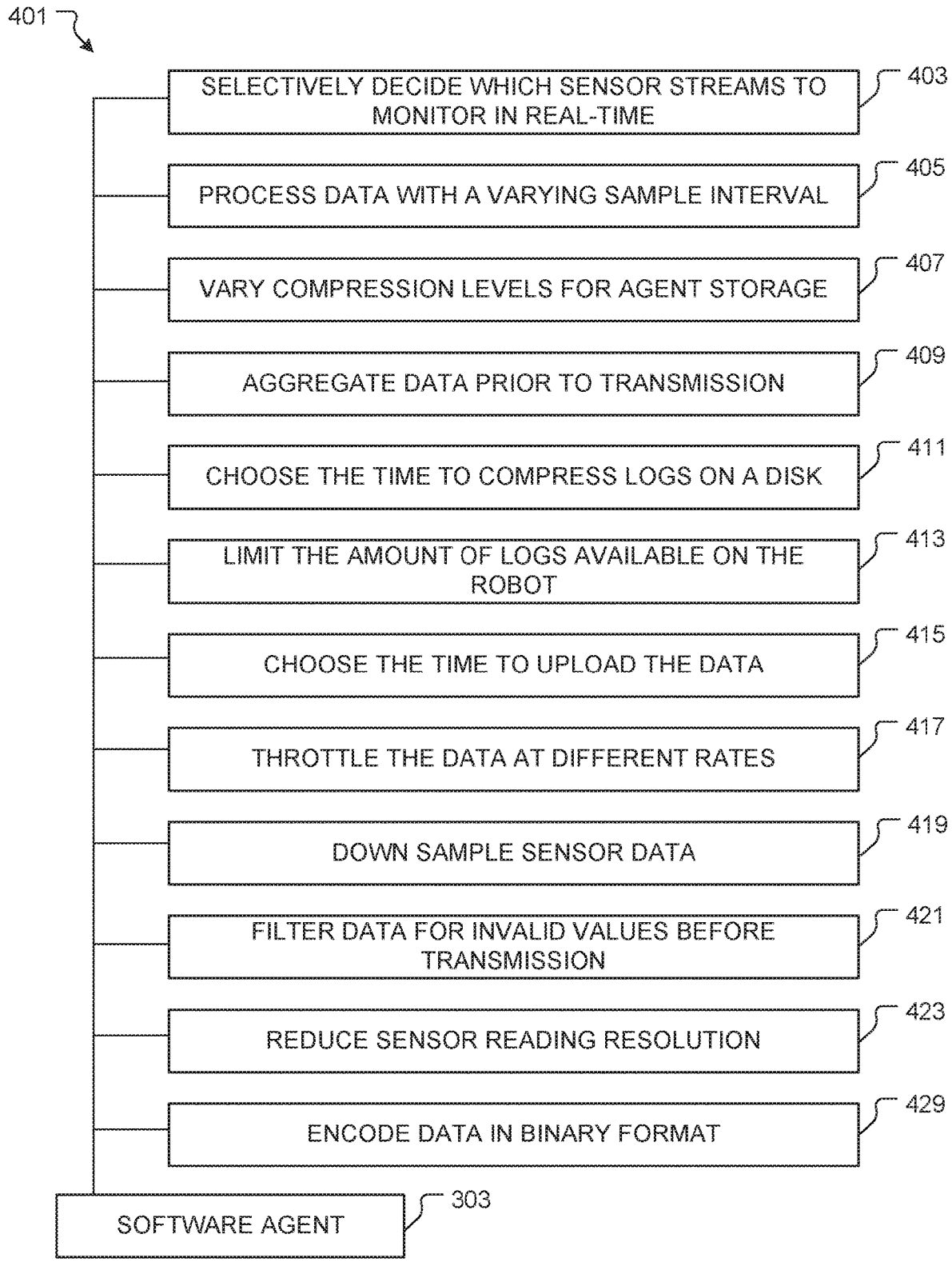
FIG. 4 is a flowchart of a method of controlling data acquisition and transmission.

The system 101 provides a means for resource utilization in a variety of ways as depicted by FIG. 4. This ensures efficiency of the system 101. These resource management methods include the following as indicated by items 403-429 respectively: (1) selectively deciding which sensor streams to monitor in real-time; (2) processing data with a varying sampling interval; (3) varying compression levels for agent-side storage; (4) aggregating data prior to transmission (e.g. calculating statistical metrics on the robot); (5) choosing the appropriate time to compress logs on disk; (6) limiting the amount of logs available on the robot; (7) choosing at which time to upload the data to the cloud; (8) throttling the data at different rates (e.g. 0.1 Hz, 1 Hz, 10 Hz); (9) down sampling sensor data (e.g. removing intermediate laser measurements); (10) filtering data for invalid values before transmission; (11) reducing sensor reading resolution to only what is necessary for human inspection; and (12) encoding of data in binary format for efficient transmission.

The software agent 303 component of the system 101 further defines a set of independent "run levels" for each of the different modules that can execute a given function, such as monitoring, teleoperation, diagnosis, etc. This "run level" indicates how many robot resources this module is able to consume at a given point in time, utilizing a combination of the techniques above appropriate to the specific sensors and function involved. In other words, the system is configured to determine the best course of action to optimize the resources of the robot 103.

In addition, the software agent 303 component of the system 101 constantly monitors (a) the current CPU, memory, network and storage utilization on the robot 103, (b) the current operational status of the robot 103 and (c) other environmental factors such as available network bandwidth, again, ensuring the maximum benefit of the resources of the robot 103.

The cloud service keeps a representation of each of the modules available on each software agent 303 and the current run level for each of these modules on each of the robots in the fleet. This feature allows for a user to monitor a single robot or an entire fleet as needed.

In addition, the cloud service maintains a correspondence between the different available end-user actions in the system 101 and the software agent 303 modules required to satisfy each action.

The cloud service uses a connection-oriented communication channel with the end-users 111. Through this interface, the cloud service keeps track of whenever an end-user 111 starts or stops using a given function for a given robot 103 or set of robots through the user interface or API.

Whenever an end-user 111 requests or releases a given function for a given robot 103, the cloud service calculates the minimum requested "run level" for each module for each robot 103 and, if there is a change, the cloud service immediately informs the robot 103 what is the new "run level" requirement for any given module.

The software agent 303 will listen to agent module "run level" change requests from the cloud service. When a request for a higher "run level" than currently running for an agent module is received, the software agent 303 will check if robot resources are available to satisfy the requested "run level" and if so increase the resource usage for this agent module. If a request for a lower "run level" is received, then that module's "run level" is reduced and it stops using resources.

If available robot resources decrease and the robot 103 is in active autonomous operation, modules are temporarily set to a lower "run level" than requested to free up robot resources.

If a module is set to a lower "run level" than requested by the cloud service and robot resources become available, the software agent 303 will increase the "run level" of the robot module.

If robot resources decrease and the robot 103 has halted its autonomous operation due to a problem, then module "run level" is set to the level requested by the cloud service despite the lack of robot resources in order to prioritize the ability to reestablish cloud service remotely through the system 101.

It should be appreciated and understood that a plurality of detailed elements could be utilized to achieve the benefits of the system 101 of the present invention, however, exemplary embodiments are disclosed herein.

For example, in one possible embodiment, the cloud service component is represented by a Web server framework such as Meteor [Reference: www.meteor.com/]. The client protocol to users is using WebSockets [Reference: developer.mozilla.org/en-US/docs/Web/API/WebSockets_API], a connection-oriented protocol based on HTTP 1.1.

We'll call the cloud service component that keeps track of the required agent module runlevel for each robot Agent-Manager. This component includes a database table that keeps an entry for each combination of (robot, module, runlevel) and keeps track of how many user requests have been queued for that combination in a value field.

This allows the AgentManager to know at any given time the currently requested runlevel for a given <robot, module> combination by querying for the highest value of runlevel that has a value higher than 0.

This AgentManager also provides two API methods: "requestMore", which allow different parts of the application to inform about a new user requesting a given runlevel for a given robot module, and "requestLess", which allow informing about a user who no longer request this runlevel.

Whenever it executes any of these methods, the Agent-Manager will update the corresponding collection by incrementing or decrementing the value field for the provided (robot, module, runlevel) combination and perform a before/after comparison of the requested runlevel for the given (robot, module) combination. If there is a before/after change in requested runlevel, this will be emitted as a runlevel change request for this module to this robot.

In this embodiment, the communication between the cloud service and the agent is implemented using MQTT, a connection-oriented publisher/subscriber protocol designed for IoT devices which runs over WebSockets and TCP/IP.

The agent listens to runlevel change requests on a topic specific to each robot with the form r/<robot_id>/in_cmd for String messages with the format "load_module|<module_name>|<requested_runlevel>".

On the application side, the application logic includes requestMore and requestLess calls within different cloud services. One particularly useful pattern is to use Meteor publications and subscriptions to identify in real-time when users need access to each specific robot information.

In another embodiment, the robot uses the Robot Operating System (ROS). ROS is an open-source, meta-operating system that provides hardware abstraction, low-level device control, implementation of commonly-used functionality, message-passing between processes, and package management. It also provides tools and libraries for obtaining, building, writing, and running code across multiple computers. [Reference: http://wiki.ros.org/ROS/Introduction]

On the client side, each component that displays information includes a Meteor subscription that specifies the given robot, module and runlevel required to render the information. Some examples include: (1) A client UI widget that displays a Camera feed has a subscription requesting the ImageModule for the corresponding robot at runlevel 5 or 10 (depending on the company and user setting for camera speed for that robot). (2) A client UI widget that displays the robot's ROS Diagnostics information includes a Meteor subscription for the RosDiagnosticsModule at a fixed runlevel 5.

In the Meteor publisher/subscriber protocol, the cloud service is notified with events whenever any subscription is started or ended by the client. These events are used to call requestMore and requestLess when a new publication is started of finished, respectively.

Publication opening or closing is triggered immediately when a user connects, changes which widgets are displayed, closes the browser, gets disconnected due to a network error or the user session becomes idle.

This allows that when a user opens a screen with details including a ROS Diagnostics widget for a given robot, a publication is opened and thus a runlevel increase request ends up going all the way to the robot.

When this user selects a different robot to view, the first publication is closed and a new one is created. The publication closing translates to a call to requestLess, which in turn sends a request to the agent to reduce the runlevel for the ROS Diagnostics module on this robot. The other publication opening on the other hand ends up translating on a module runlevel increase for a different robot.

As a further example, a localization module implements the capability to monitor the position in 2D of an autonomous robot using the ROS navigation stack. Since the data flow on the robot side for 2D navigation is very large, the most important resource to manage dynamically for this module is the network usage.

In order to function, this module monitors several data streams, which operate at high frequency and generate a significant volume of data. These streams can include (1) Robot transformations stream (tf topic); (2) Local obstacle map; (3) Laser Scan.

Sending all this information to the cloud service without adaptive manipulation would consume significant network upload bandwidth, in many cases beyond the total available bandwidth for that network connection.

This module can be in one of four different modes depending on the intended usage: (1) Disabled: This module is entirely disabled by policy. Runlevel=0; (2) Not visible: No user is actively monitoring this information on this robot. Runlevel=1; (3) Overview: This information is being presented as part of an overview of the robot status, together with other information during a high-level oversight. This same mode is used when monitoring the 2D position of many robots at once through a gallery display. Runlevel=5; and (4) Active: The user is focusing on this particular robot to understand in more detail a possible issue with localization or about to take manual control of the robot. This view occupies a higher portion of the screen. Runlevel=10.

In the highest runlevel possible, the information is intended to be displayed remotely via the Internet for visual interpretation by a human on a computer screen. For this reason, the following resource optimization are done at all times: (1) Robot transformations stream is filtered to only the following transformations: Map to Robot/Specification Robot to Laser Scan; (2) Map to Robot transformation is throttled down to 1 Hz maximum; (3) Robot to Laser Scan is sent only once per session; (4) Local obstacle map is throttled down to 0.1 Hz and resolution reduced to a maximum of XYZ; (5) Local obstacle map is compressed into 1-channel PNG format; (6) Laser scan is throttled down to 1 Hz, downsampled to a minimum of 1 degree per sample and each measurement rounded; (7) Laser scan readings are encoded using RLE; (8) All messages are encoded in binary using protobuf as the payload format. At the highest runlevel (10), this ends up reducing network usage by up to 10,000 times.

In the next lower runlevel (5), the agent module further reduces network usage by: (1) Throttling Map to Robot transformation to 0.1 Hz; (2) Disabling local obstacle map transmission; and (3) Throttling Laser scan data down to 0.1 Hz. In this runlevel, the average network usage goes down by a factor of 10 or higher.

In runlevel (1), laser scan transmission is also disabled, resulting in a network usage reduction of another 10×.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A system for adaptive diagnostics and data collection in a connected robot-cloud environment, comprising:
    an electronic environment established between an interface and at least one computing device via a network;
    at least one robot in electronic communication with the interface; and
    a software agent configured to monitor the storage utilization of the at least one robot, the current operational status of the at least one robot, and the network bandwidth of the at least one robot;
    wherein the data acquired from the robot is managed and utilized via the interface; and
    wherein the data and the control thereof is available to an end-user via the said interface.

2. The system of claim 1 wherein the interface is active in a cloud-based environment.

* * * * *